United States Patent
Zäpfel et al.

(10) Patent No.: US 10,589,745 B2
(45) Date of Patent: Mar. 17, 2020

(54) DRIVE DEVICE FOR AN ALL-WHEEL-DRIVE MOTOR VEHICLE

(71) Applicant: AUDI AG, Ingolstadt (DE)

(72) Inventors: Steffen Zäpfel, Kösching (DE); Klaus Wohlrab, Weißenburg (DE); Wolfgang Koch, Kösching (DE); Ferenc Janosi, München (DE); Horst Wild, Engelthal (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/759,306

(22) PCT Filed: Oct. 7, 2016

(86) PCT No.: PCT/EP2016/073958
§ 371 (c)(1),
(2) Date: Mar. 12, 2018

(87) PCT Pub. No.: WO2017/060403
PCT Pub. Date: Apr. 13, 2017

(65) Prior Publication Data
US 2018/0251130 A1     Sep. 6, 2018

(30) Foreign Application Priority Data
Oct. 7, 2015  (DE) .................. 10 2015 013 000

(51) Int. Cl.
*B60W 30/184*     (2012.01)
*B60W 10/06*      (2006.01)
(Continued)

(52) U.S. Cl.
CPC ......... *B60W 30/1846* (2013.01); *B60K 28/16* (2013.01); *B60W 10/02* (2013.01);
(Continued)

(58) Field of Classification Search
CPC ............ B60W 30/1846; B60W 10/06; B60W 2710/0666; B60W 2520/266; B60W 2040/1353; B60W 2040/1384
See application file for complete search history.

(56) References Cited

U.S. PATENT DOCUMENTS 5,737,714 A * 4/1998 Matsuno ............ B60K 17/3462
                                                180/197

FOREIGN PATENT DOCUMENTS

DE     38 82 436 T2    11/1993
DE     196 03 427 A1    8/1996
(Continued)

OTHER PUBLICATIONS

Translation of the International Preliminary Report on Patentability dated Apr. 19, 2018 of corresponding International Application No. PCT/EP2016/073958; 9 pgs.
(Continued)

*Primary Examiner* — Erin D Bishop
(74) *Attorney, Agent, or Firm* — Maier & Maier, PLLC

(57) ABSTRACT

A drive device for an all-wheel drive, two-track motor vehicle, in the drive train of which a first motor vehicle axle and, via a center clutch, a second motor vehicle axle are driven permanently by a drive assembly in driving operation. In the closed state of the center clutch, the second vehicle axle is engaged with the drive train, and, in the open state of the clutch, the second vehicle axle is decoupled from the drive train. In a driving situation with engaged all-wheel drive as well as with axle friction coefficients of varying size, a greater wheel torque can be taken up at the vehicle axle with a large axle friction coefficient than at the vehicle axle with a small axle friction coefficient, and a control
(Continued)

instrument is provided, which, for engine torque limitation, limits the drive assembly to a maximum allowed engine torque.

10 Claims, 3 Drawing Sheets

(51) Int. Cl.
  *B60K 28/16* (2006.01)
  *B60W 10/02* (2006.01)
  *B60W 10/12* (2012.01)
  *B60W 10/18* (2012.01)
  *B60W 40/13* (2012.01)

(52) U.S. Cl.
  CPC ............ *B60W 10/06* (2013.01); *B60W 10/12* (2013.01); *B60W 10/18* (2013.01); *B60W 2040/1384* (2013.01); *B60W 2510/0208* (2013.01); *B60W 2520/263* (2013.01); *B60W 2710/0666* (2013.01); *B60W 2710/083* (2013.01); *B60W 2710/125* (2013.01); *B60W 2710/18* (2013.01)

(56) References Cited

FOREIGN PATENT DOCUMENTS

| DE | 10 2009 005 378 A1 | 4/2010 |
| DE | 10 2010 014 563 A1 | 10/2011 |
| DE | 10 2010 028 546 A1 | 11/2011 |
| DE | 10 2011 006 166 A1 | 9/2012 |
| DE | 10 2012 020 908 A1 | 5/2014 |

OTHER PUBLICATIONS

German Examination Report dated Jun. 9, 2016 of corresponding German application No. 10 2015 013 000.5; (7 pgs., including machine-generated English translation).

Written Opinion of the International Search Authority dated Dec. 13, 2016 of corresponding International Application No. PCT/EP2016/073958; 9 pgs.

International Search Report dated Dec. 13, 2016 of corresponding International Application No. PCT/EP2016/073958; 9 pgs.

* cited by examiner

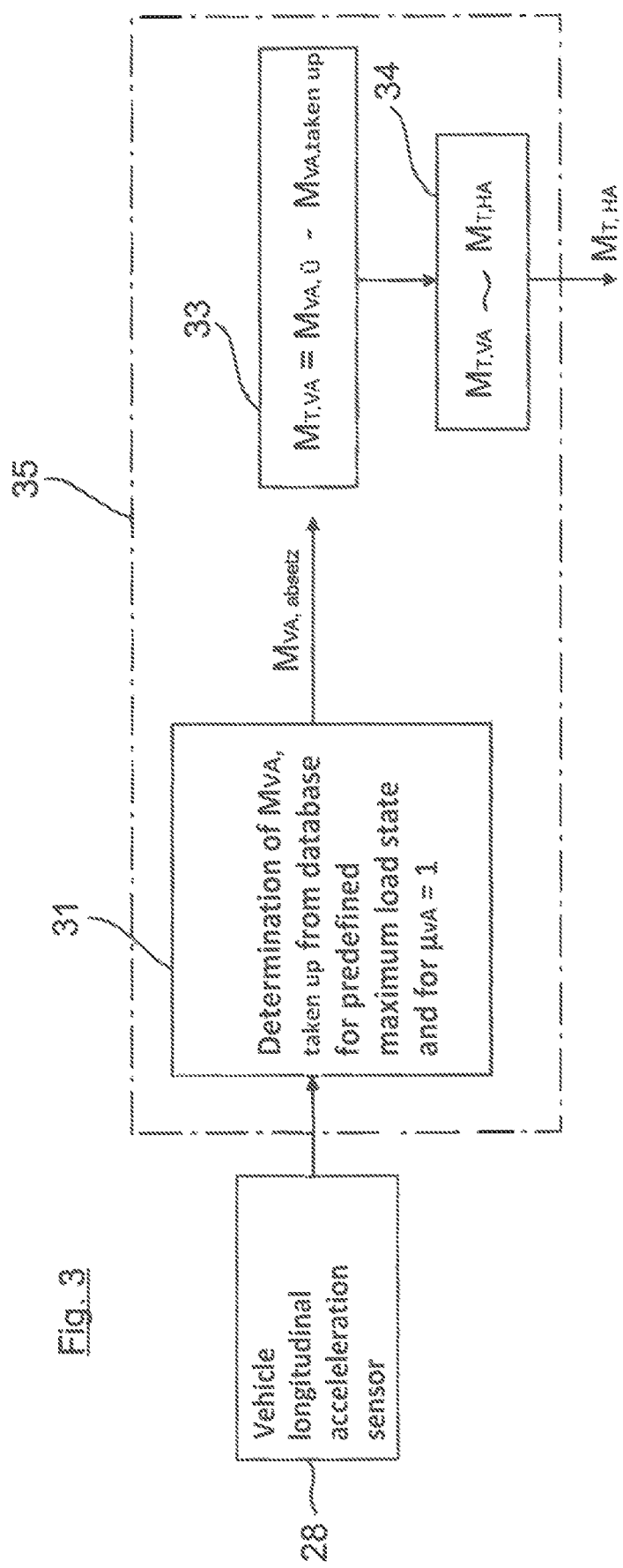

DRIVE DEVICE FOR AN ALL-WHEEL-DRIVE MOTOR VEHICLE

FIELD

The invention relates to a drive device for an all-wheel drive, two-track motor vehicle and to a method for operating such a drive device.

BACKGROUND

For all-wheel drive motor vehicles, a distinction is made between an engageable all-wheel drive and a permanent all-wheel drive. In the case of a permanent all-wheel drive, the drive torque produced in the drive assembly is distributed via a mechanical inter-axle differential, such as, for example, a Torsen differential, essentially uniformly to the front axle and to the rear axle. Torque or speed differences are compensated for via the inter-axle differential between the two vehicle axles. In contrast to this, for an engageable all-wheel drive, the inter-axle differential is replaced by a rigid center clutch. By means of the center clutch, it is possible, as needed, to engage the rear axle with the drive train or to decouple it from the drive train. In such an engageable all-wheel drive—in contrast to the above permanent all-wheel drive with an inter-axle differential—there is no speed or torque compensation between the vehicle axles.

Known from DE 10 2012 020 908 A1 is a generic drive device for an all-wheel drive, two-track motor vehicle. Arranged in the drive train of the motor vehicle is a drive assembly constructed from an internal combustion engine with a downstream manual transmission, via which, in driving operation, the front axle is permanently driven. The transmission output shaft extends up to a center clutch, which is in drive connection with the rear axle via a Cardan shaft. In the closed state, the center clutch is subjected to a coupling torque. In order to ensure the absence of slippage, the center clutch can be operated in the closed state with excess contact pressure. In this case, the rear axle is engaged rigidly with the drive train. In the open or disengaged state of the center clutch, the rear axle is decoupled from the drive train.

In the above rigid all-wheel drive, the engine torque delivered by the drive assembly in driving operation is distributed in accordance with the axle friction coefficient (which acts between the vehicle wheels and the roadway) at the front axle and with the axle friction coefficient at the rear axle. By way of example, for equal axle friction coefficients, the wheel torque that can be taken up at the front axle and at the rear axle is, respectively, 50% of the total wheel torque delivered by the engine.

In a driving situation with engaged all-wheel drive as well as with the front axle on asphalt and with the rear axle on ice, the following constellation results: in this case, the front axle provides a greater ability to take up torque than the rear axle. This means that a greater wheel torque can be taken up at the front axle than at the rear axle with a smaller axle friction coefficient. This can lead to the fact that the wheel torque applied at the front axle exceeds a critical overload threshold value. This results in the danger of an axle overload, in particular an overload of the bevel gear of the front-axle differential.

For protection against such an axle overload, a component protection function can be created in a motor vehicle with purely front-wheel drive, for which the maximum allowed engine torque is calculated from an addition of an overload threshold value, which is predetermined by design and is deposited in the control instrument and for which, when it is reached, there exists the danger of a component damage at the front axle, with the moment of inertia of the engine. The moment of inertia of the engine is needed for acceleration of the engine and therefore does not place a load on the front axle.

Although, in this way, a protection of the components of the front axle against overload is ensured, the engine torque limitation results in limitations in regard to the engine performance as well as a time loss during the starting operation and reduced hill climbing and starting abilities on slopes.

SUMMARY

The object of the invention consists in providing a drive device for an all-wheel drive motor vehicle as well as a method for operating such a drive device, for which the danger of an axle overload is reduced and, at the same time, in the case of an engine torque limitation, a reduced engine performance is present in comparison to the prior art.

In accordance with the disclosure, the control instrument has an analysis unit for prevention of an axle overload in the driving situation indicated above, by means of which the maximum allowed engine torque can be determined and adjusted. The maximum allowed engine torque is determined in the analysis unit by addition of the overload threshold value of the vehicle axle, which is predetermined by design and has a large axle friction coefficient, and at least one maximum allowed potential moment of inertia fraction at the vehicle axle with a small axle friction coefficient. The moment of inertia fraction at the vehicle axle with a small axle friction coefficient relieves the vehicle axle with a large axle friction coefficient. In the calculation of the maximum allowed engine torque, it is therefore possible to add this moment of inertia fraction, without anything further, to the overload threshold value, without risking an overload of the vehicle axle with a high axle friction coefficient.

For a simpler understanding, the further aspects of the invention will be explained below on the basis of a especially relevant driving situation, for which, by way of example, the front axle of the all-wheel drive is driven on asphalt (that is, higher axle friction coefficient at the front axle) and the rear axle of the all-wheel drive is driven on ice (that is, lower axle friction coefficient at the rear axle). However, the aspects of the invention are not limited to this special driving situation. Alternatively, a driving situation is also conceivable for which, at the rear axle, a higher axle friction coefficient, and, at the front axle, a lower axle friction coefficient will be present.

In a technical implementation, the above-mentioned analysis unit has a program module in which the potentially possible moment of inertia fraction of the rear axle, which relieves the front axle, can be determined. For this purpose, the program module has a first determination unit, in which, initially, the maximum axle torque that can be taken up at the front axle is determined. In the first determination unit, the maximum axle torque that can be taken up at the front axle is determined on the basis of a predefined maximum load state as well as on the basis of a front-axle friction coefficient that is set to 1, for example, via characteristic curves or from a table. Entering into the predefined maximum load state are the center of gravity of the vehicle as well as a maximum weight during vehicle load. In addition, the determination of the maximum torque that can be taken up at the front axle results as a function of the current longitudinal acceleration of the vehicle. When a vehicle is not moving, the longitudinal acceleration corresponds to the slope of the roadway. When a vehicle is accelerating, the longitudinal acceleration corresponds to a total value obtained from the slope of the roadway and the acceleration of the vehicle.

The maximum torque that can be taken up at the front axle, which is determined in the first determination unit, is conveyed to a subtraction unit, in which a maximum allowed front-axle moment of inertia is determined and, indeed, is done so by subtraction of the maximum torque that can be taken up at the front axle from the front-axle overload threshold value. The maximum allowed front-axle moment of inertia defines a potential that (for $\mu_{VA}=1$ as well as for maximum load state) an actual front-axle moment of inertia is permitted to take in, without the front-axle overload threshold value being exceeded.

The analysis unit has, in addition, a second determination unit, in which, on the basis of the maximum allowed front-axle moment of inertia, the above-mentioned moment of inertia fraction at the rear axle can be determined.

On account of the rigid center clutch between the front and rear axles, the moment of inertia fraction of the rear axle behaves directly proportionally to the front-axle moment of inertia and, indeed, does so as a function of the inertia fractions of the components of the vehicle axles and the components lying between them. For this reason, in the second determination unit, the mass inertias of the front-axle components are set in a mass inertia ratio to the mass inertias of the rear-axle components. Taking into consideration the mass inertia ratio, the moment of inertia fraction at the rear axle is calculated (in a simple rule of three calculation).

Moreover, the analysis unit can have an additional program module, in which a minimum axle torque that can be taken up at the rear axle can be estimated. Such a minimum axle torque at the rear axle relieves the front axle. In the calculation of the maximum allowed engine torque, therefore, it is possible to add the rear-axle minimum axle torque—in addition to the moment of inertia fraction of the rear axle—to the front-axle overload threshold value.

In another embodiment, the drive device can have an electronic differential lock, by means of which, a rear-axle wheel of the vehicle that turns during startup can be braked in a targeted manner by means of a braking torque generated by the brake system. In this way, via the rear-axle differential, the other rear-axle wheel is subjected to an additional torque, the amount of which is equal to the braking torque. The analysis unit can have an additional program module, in which the additional torque and the braking torque can be summed up to an EDS total torque. In the determination of the maximum allowed engine torque, this total torque—in addition to the above potential moments of inertia—can be added to the front-axle overload threshold value.

Between the above program modules for calculation of the EDS total torque and of the minimum rear-axle torque, it is possible to connect a first compensating module. The first compensating module can convey the greater value obtained from the minimum rear-axle torque and the EDS total torque to the additional element and retain the smaller value.

A second compensating module can be connected downstream of the first compensating module. In the second compensating module, the minimum rear-axle torque taken at the rear axle or the EDS total torque can be limited to the magnitude of the set center clutch torque (provided the latter is lower than the potentially possible rear-axle torque).

The above determination of the maximum allowed engine torque is carried out continuously and is adjusted during a starting operation. In this way, during startup, there results a substantially faster response behavior, because the maximum engine torque can be set substantially higher in comparison to the prior art and, in spite of this, a protection of the front-axle components is still ensured.

The advantageous embodiments and/or enhancements of the invention discussed above and/or presented in the dependent claims—apart from, for example, cases of clear dependences or incompatible alternatives—can be used individually or also in any combination.

BRIEF DESCRIPTION OF THE FIGURES

The invention and its advantageous embodiments and enhancements as well as the advantages thereof will be explained in detail below on the basis of drawings.

Shown are:

FIG. 3 another flowchart, in which the determination of the rear-axle moment of inertia fraction is illustrated.

DETAILED DESCRIPTION OF THE FIGURES

Figure 1:
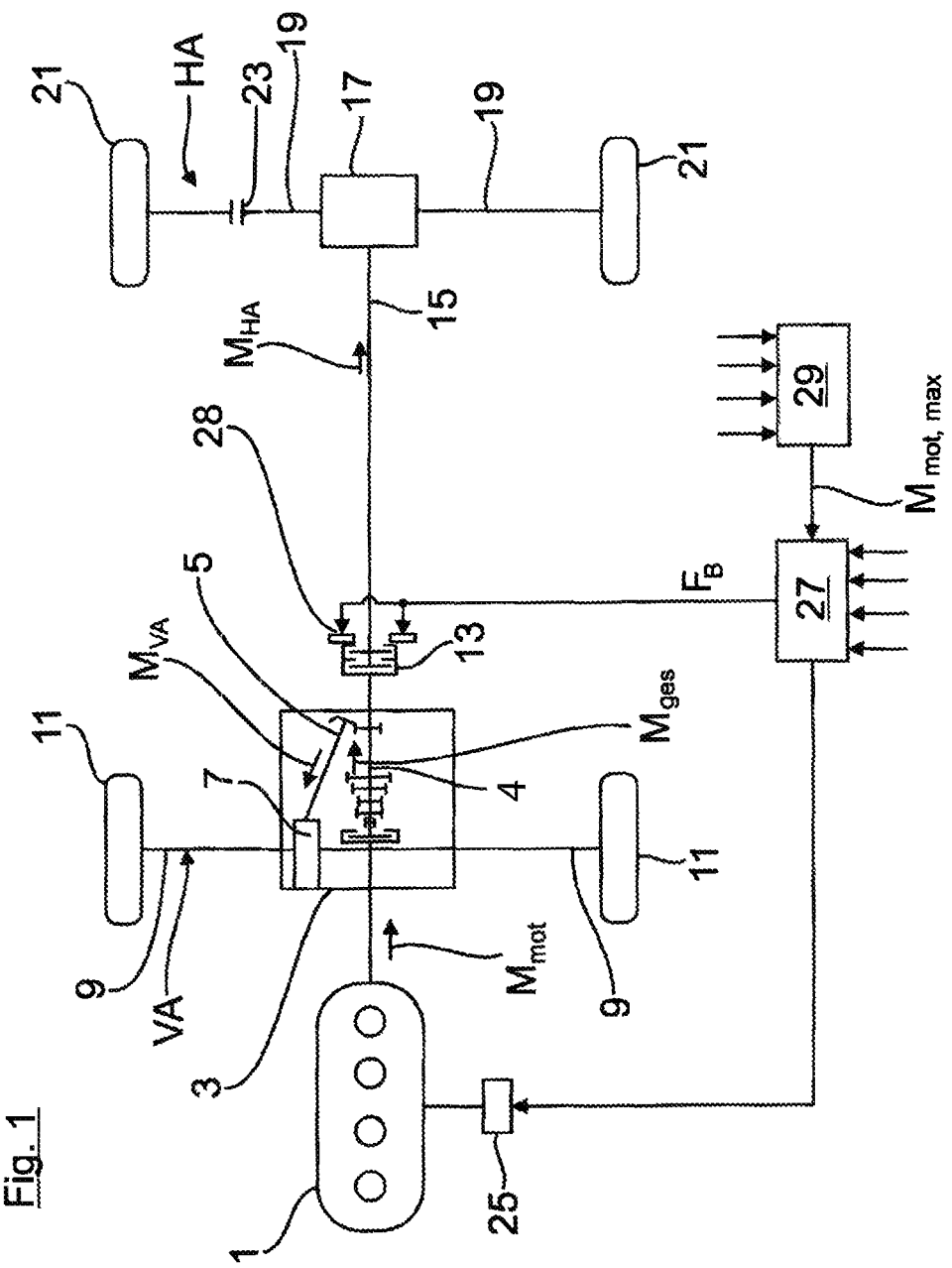
FIG. 1 in a schematic illustration, the drive train of a two-track motor vehicle.
Figure 2:
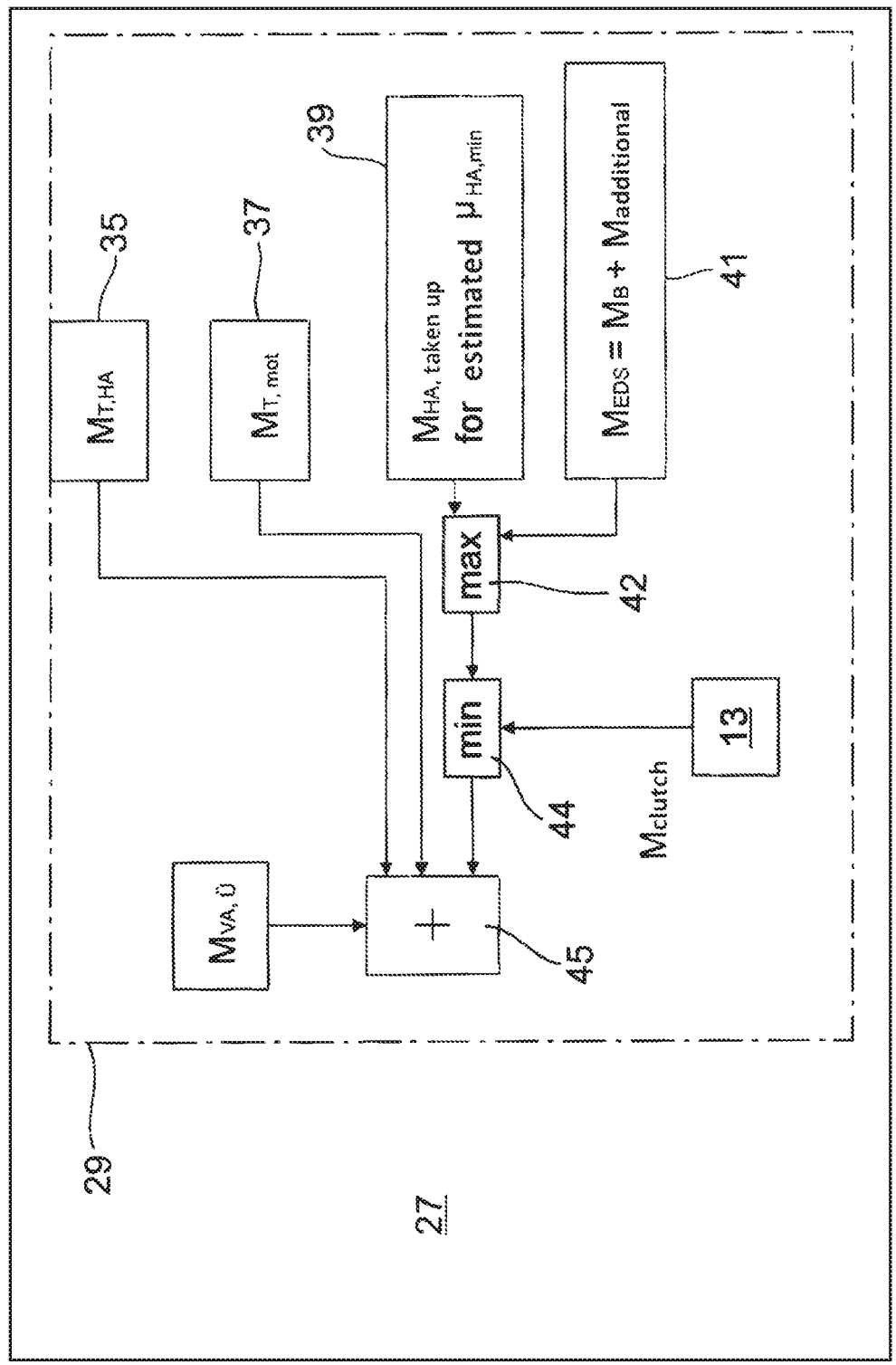
FIG. 2 in a simplified flowchart, the program modules of an analysis unit of an electronic control instrument, with which an engine torque limitation can be implemented.

In FIG. 1, a drive train in a two-track motor vehicle is shown. FIG. 1 and FIG. 2 have been prepared with the aim of providing a simple understanding of the invention. For this reason, the figures are merely highly simplified illustrations, which do not present a construction of the drive train or of the software architecture present in the electronic control instrument that is true to reality.

In accordance with FIG. 1, the drive train of the motor vehicle has a drive assembly, which is constructed from an internal combustion engine 1 and a downstream manual transmission 3. The transmission output shaft 4 thereof is in drive connection via a toothed gear step 5 with a front-axle differential 7 of a front axle VA, by means of which the front wheels 11 are driven via the universal joint shafts 9.

The transmission output shaft 4 is in fixed connection with a clutch housing of a center clutch 13, which can be coupled to a Cardan shaft 15. The rear wheels 21 of a vehicle rear axle HA are driven by the Cardan shaft 15 via a rear-axle differential 17 as well as via universal joint shafts 19. In addition, in the right universal joint shaft 19 of the rear axle HA, a dog clutch is installed.

In FIG. 1, the dog clutch 23, the center clutch 13, and an engine control instrument 25 of the internal combustion engine 1 are in signal connection with a control instrument 27, which, on the basis of a large number of driving operation parameters, controls an engagement or disengagement of the all-wheel drive of the motor vehicle. For an engaged all-wheel drive, the flow of torque indicated in FIG. 1 results, after which an engine torque $M_{mot}$ is conveyed from the internal combustion engine 1 to the manual transmission 3 and is applied there, as a total wheel torque, at the transmission output shaft 4. The total wheel torque $M_{ges}$ is divided into a wheel torque $M_{VA}$ which is conveyed to the front axle VA, and into a second wheel torque $M_{HA}$, conveyed to the rear axle HA conveyed via the closed plate clutch 13. For an engaged all-wheel drive, the control instrument 27 actuates a clutch actuator 28. Said clutch actuator generates a contact force $F_B$, with which, when there is excess contact pressure, a slip-free or slippage-free transmission of the wheel torque $M_{HA}$ to the rear axle HA is ensured.

The control instrument 27 controls an engine torque limitation, for which the drive assembly 1 can be limited to a maximum allowed engine torque $M_{mot,max}$. In order to attain a high acceleration of the vehicle during a starting operation, the determination of as well as the adjustment of the maximum allowed engine torque $M_{mot,max}$ to the current driving situation take place continuously during the starting operation in order that a front-axle overload is prevented. Such a front-axle overload results, in particular, in a driving situation for which the front axle VA is driven on asphalt (that is, high front-axle friction coefficient) and the rear axle HA of the all-wheel drive is driven on an icy surface (that is, low rear-axle friction coefficient).

As mentioned above, the determination and adjustment of the maximum allowed engine torque $M_{mot,max}$ takes place in an analysis unit 29 of the control instrument 27 during a starting operation, for example. In this way, during startup, there results a substantially faster response behavior, because the maximum allowed engine torque $M_{mot,max}$ can be set substantially higher than is the case for conventional calculation methods known from the prior art, without an axle overload resulting at the front axle VA.

As can be seen from FIG. 2, a front-axle overload threshold value $M_{VA,\ddot{U}}$ serves as starting value in the determination of the maximum allowed engine torque $M_{mot,max}$. The front-axle overload threshold value $M_{VA,\ddot{U}}$ is predetermined by design and is deposited in the analysis unit 29. When the front-axle overload threshold value $M_{VA,\ddot{U}}$ has been attained, there exists the danger of component damage at the front axle VA.

The starting value (that is, the front-axle overload threshold value $M_{VA,\ddot{U}}$) is increased in driving operation depending on the situation and, indeed, is done so by adding together torque fractions, which, in the above driving situation, relieve the front axle VA, namely, by a maximum allowed potential rear-axle moment of inertia $M_{T,HA}$ as well as a moment of inertia of the engine $M_{T,mot}$, and either a rear-axle minimum axle torque $M_{HA,taken\ up}$ or an EDS total torque $M_{EDS}$.

The torque fractions given above are determined in the program modules 35, 37, 39, 41 of the analysis unit 29. Said program modules are in signal connection with a summing element 45, in which the front-axle overload threshold value $M_{VA,\ddot{U}}$ is added to the torque fractions that relieve the front axle VA. The sum thereof affords the maximum allowed engine torque $M_{mot,max}$.

As explained below, the maximum allowed potential rear-axle moment of inertia $M_{T,HA}$ and the rear-axle minimum axle torque $M_{HA,taken\ up}$ are not calculated on the basis of a sensor-recorded angular acceleration dω and on the basis of a mass inertia of the respective components, but are estimated in the program modules 35 and 39. In this way, the maximum allowed engine torque $M_{mot,max}$ can be increased initially even without having to wait for a sensor recording of the angular velocity ω.

The determination of the maximum allowed potential rear-axle moment of inertia $M_{T,HA}$ that relieves the front axle VA takes place in a first program module 35 of the analysis unit 29, which is shown in more detail in FIG. 3. Accordingly, the program module 35 has a first determination unit 31, in which, initially, a maximum front-axle torque $M_{VA,taken\ up}$ that can be taken up at the front axle VA is determined. In the first determination unit 31, the maximum axle torque $M_{VA,taken\ up}$ that can be taken up at the front axle VA is determined on the basis of a predefined maximum load state as well as a front-axle friction coefficient $\mu_{VA}$ that is set to 1 (for example, via characteristic curves or tables). Entering into the predefined maximum load state are the center of gravity of the vehicle as well as a predetermined maximum weight of the vehicle. Therefore, in the determination, an extreme case is assumed, in which a maximum weight is loaded on the front axle VA and the front-axle friction coefficient $\mu_{VA}$ is 1.

In FIG. 2, the first determination unit 31 is in signal connection with a longitudinal acceleration sensor 28, so that the maximum torque that can be taken up at the front axle $M_{VA,taken\ up}$ results as a function of the current longitudinal acceleration ax of the vehicle. When the motor vehicle is not moving, the longitudinal acceleration corresponds to a slope of the roadway. For an accelerating vehicle, the longitudinal acceleration corresponds to a total value obtained from the slope of the roadway and an acceleration of the vehicle.

The maximum torque that can be taken up at the front axle $M_{VA,taken\ up}$, which is determined in the first determination unit 31, is conveyed in FIG. 3 to a subtraction unit 33. In the subtraction unit 33, a maximum allowed potential front-axle moment of inertia $M_{T,VA}$ is determined and, indeed, is done so by subtraction of the maximum torque that can be taken up at the front axle $M_{VA,taken\ up}$ from the front-axle overload threshold value $M_{VA,\ddot{U}}$. The maximum allowed potential rear-axle moment of inertia $M_{T,VA}$ defines a threshold value that can be attained by an actual front-axle moment of inertia, without exceeding the front-axle overload threshold value $M_{VA,\ddot{U}}$.

In FIG. 2, the program module 35 has, in addition, a second determination unit 34, in which, on the basis of the maximum allowed potential front-axle moment of inertia $M_{T,VA}$, the maximum allowed potential rear-axle moment of inertia $M_{T,HA}$ can be determined.

Used in the determination of the maximum allowed rear-axle moment of inertia $M_{T,HA}$ in the second determination unit 34 is the fact that, in the engaged state of the center clutch, the moment of inertia $M_{T,HA}$ at the rear axle HA correlates linearly with the moment of inertia $M_{T,VA}$ at the front axle VA and, indeed, does so depending on the inertia fractions of the components of the vehicle axles VA, HA and the components lying between them.

Against this background, in the second determination unit 31, the mass inertias of the components of the front axle VA are set in a mass inertia ratio to the mass inertias of the components of the rear axle HA. Taking this into consideration, the maximum allowed potential moment of inertia fraction $M_{T,HA}$ at the rear axle HA is calculated in a simple rule of three calculation.

In accordance with FIG. 2, in the second program module 37 of the analysis unit 29, the moment of inertia of the engine $M_{T,mot}$ ($=J_{mot} \cdot d\omega_{mot}$), which relieves the front axle VA, is calculated, where $J_{mot}$ is the mass inertia and $\omega_{mot}$ is the sensor-recorded angular velocity of the engine components.

In the third program module 39 of the analysis unit 29, a minimum axle torque $M_{HA,taken\ up}$ that can be taken up at the rear axle HA on an icy surface is estimated, and, indeed, is done so for an estimated rear-axle friction coefficient $\mu_{VA}$ of between, for example, 0.01 and 0.1.

In the fourth program module 41, an additional torque $M_{additional}$ and a braking torque $M_B$ are summed together to give a total torque $M_{EDS}$. The additional torque $M_{additional}$ and the braking torque $M_B$ are obtained for an EDS (EDS=electronic differential lock) engagement at the rear axle HA, which is described below.

For such an EDS engagement, the drive device can have an electronic differential lock, with which a vehicle wheel 11 of the rear axle HA that turns during startup can be braked in a targeted manner by a braking torque $M_B$ that is generated by the brake system. In this way, via the rear-axle differential 17, an additional torque $M_{additional}$ is imposed on the other vehicle wheel 11 of the rear axle HA, the amount of which is equal to that of the braking torque $M_B$. As already mentioned above, in the program module 41, the additional torque $M_{additional}$ and the braking torque $M_B$ are summed together to give a total torque $M_{EDS}$. The total torque $M_{EDS}$ is—in addition to the above moments of inertia as well as in addition to the minimum rear-axle torque—added to the maximum axle torque $M_{VA,taken\ up}$ that can be taken by the front axle in order to obtain thereby the maximum allowed engine torque $M_{mot,max}$.

As can be seen further from FIG. 2, a first compensating module 45 is connected in the signal pathway between the two parallel-connected program modules 39, 41 and the summing element 45. The first compensating module 42 further conveys the greater torque value obtained from the minimum rear-axle torque $M_{HA,taken\ up}$ and the EDS total torque $M_{EDS}$ to the summing element 45 and retains the smaller value.

Connected downstream of the first compensating module 42 is a second compensating module 44. In the second compensating module 44, the greater value conveyed from the first compensating module 42 is compared to a current center clutch torque $M_{clutch}$. In this case, the second compensating module 44 further conveys the smaller value obtained from the comparison. This means that the torque taken up at the rear axle HA is limited to the magnitude of the set center clutch torque (provided the latter is less than the potentially possible rear-axle torques).

The invention claimed is:

1. A drive device for an all-wheel drive, two-track motor vehicle comprising:
   a drive train, wherein in a driving operation a drive assembly of the drivetrain permanently drives a first motor vehicle axle of the drivetrain and, via a center clutch in a closed state, drives a second motor vehicle axle of the drivetrain, wherein, in the closed state of the center clutch, the second motor vehicle axle is engaged with the drive assembly and, in the open state of the clutch, the second vehicle axle is decoupled from the drive assembly, wherein, in a driving situation with engaged all-wheel drive wherein one of the first and second axles is a vehicle axle with a large axle friction coefficient and the other of the first and second axles is a vehicle axle with a small axle friction coefficient, a greater wheel torque can be taken up at the vehicle axle with the large axle friction coefficient than at the vehicle axle with the small axle friction coefficient, and wherein a control instrument is provided, which, for engine torque limitation, limits the drive assembly to a maximum allowed engine torque, wherein, for prevention of an axle overload at the vehicle axle with the large axle friction coefficient, the control instrument has an analysis unit, with which the maximum allowed engine torque can be determined and adjusted, and the maximum allowed engine torque can be determined from an addition of an overload threshold value that is predetermined and deposited in the analysis unit, wherein the overload threshold value defines a threshold above which there is a danger of component damage at the vehicle axle with the large axle friction coefficient, and at least one maximum allowed potential moment of inertia fraction at the vehicle axle with the small axle friction coefficient, said moment of inertia fraction offsetting the wheel torque at the vehicle axle with the large axle friction coefficient.

2. The drive device according to claim 1, wherein the determination of the maximum allowed engine torque takes place continuously during a starting operation of the driving operation, so that the maximum allowed engine torque can be adjusted continuously.

3. The drive device according to claim 1, wherein the analysis unit has a program module, in which the maximum allowed potential moment of inertia fraction at the vehicle axle with the small axle friction coefficient, which offsets the wheel torque at the vehicle axle with the large axle friction coefficient, can be determined.

4. The drive device according to claim 3, wherein the program module has a first determination unit, in which a maximum wheel torque that can be taken up at the vehicle axle with the large axle friction coefficient can be determined, a subtraction unit, in which a maximum allowed potential moment of inertia at the vehicle axle with the large axle friction coefficient for which no axle overload exists can be determined, wherein the determination of the maximum allowed potential moment of inertia at the vehicle axle with the large axle friction coefficient takes place by subtraction of the maximum wheel torque that can be taken up at the vehicle axle with the large axle friction coefficient from the overload threshold value, and a second determination unit, in which, on the basis of the maximum allowed potential moment of inertia at the vehicle axle with the large axle friction coefficient, the potential moment of inertia fraction at the vehicle axle with the small axle friction coefficient can be determined.

5. The drive device according to claim 4, wherein, in the first determination unit of the program module, the maximum wheel torque that can be taken up at the vehicle axle with the large axle friction coefficient can be determined on the basis of a predefined maximum load state as well as an axle friction coefficient that is set to 1 via characteristic curves, and as a function of a current longitudinal acceleration of the vehicle.

6. The drive device according to claim 4, wherein, in the closed state of the center clutch, a maximum allowed potential moment of inertia at the vehicle axle with the small axle friction coefficient correlates linearly with the maximum allowed potential moment of inertia at the vehicle axle with the large axle friction coefficient.

7. The drive device according to claim 1, wherein the analysis unit has a program module, in which a minimum wheel torque that can be taken up at the vehicle axle with small axle friction coefficient can be estimated, and, for the determination of the maximum allowed engine torque, the minimum wheel torque is added to the overload threshold value.

8. The drive device according to claim 1, wherein the drive device has an electronic differential lock (EDS), wherein a vehicle wheel of the vehicle axle with the small axle friction coefficient that is turning during startup can be braked in a targeted manner by a braking torque that is generated by the braking system, as a result of which, via an axle differential, an additional torque is imposed on another vehicle wheel of the vehicle axle with the small axle friction coefficient, the magnitude of which equals that of the braking torque, and the analysis unit has an EDS program module, in which a EDS total torque that offsets the wheel torque at the vehicle axle with the large axle friction coefficient is additionally added to the overload threshold value.

9. The drive device according to claim 8, wherein, between the EDS program module and a summing element, a first compensating module is connected, and the compensating module further conveys the greater value obtained from a minimum wheel torque at the vehicle axle with the small axle friction coefficient and the EDS total torque to the summing element and retains the smaller value.

10. The drive device according to claim 9, wherein a second compensating module is connected downstream of the first compensating module, and, in the second compensating module, the greater value determined in the first compensating module is compared to a current center clutch torque, and the second compensating module further conveys the smaller value to the summing element.

* * * * *